(12) United States Patent
Knight et al.

(10) Patent No.: US 9,505,071 B2
(45) Date of Patent: Nov. 29, 2016

(54) ONBOARD MEASURING SYSTEM FOR MITER SAWS

(71) Applicant: Sears Brands, L.L.C., Hoffman Estates, IL (US)

(72) Inventors: Colin Knight, Winnetka, IL (US); Iqbal Singh, Buffalo Grove, IL (US); Eugene Kulig, Grayslake, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 65 days.

(21) Appl. No.: 14/543,501

(22) Filed: Nov. 17, 2014

(65) Prior Publication Data

US 2016/0136742 A1    May 19, 2016

(51) Int. Cl.
| | | |
|---|---|---|
| *B23Q 17/22* | (2006.01) | |
| *B23D 59/00* | (2006.01) | |
| *B27B 27/02* | (2006.01) | |
| *G01B 3/10* | (2006.01) | |
| *B23Q 17/20* | (2006.01) | |

(52) U.S. Cl.
CPC .............. *B23D 59/001* (2013.01); *B23Q 17/20* (2013.01); *B27B 27/02* (2013.01); *G01B 3/1084* (2013.01); *G01B 2210/58* (2013.01)

(58) Field of Classification Search
CPC . B23Q 17/20; B23Q 17/2233; B23Q 59/001
USPC .................................. 33/628, 640, 759, 760
See application file for complete search history.

(56) References Cited

U.S. PATENT DOCUMENTS

| | | | |
|---|---|---|---|
| 4,557,170 A | 12/1985 | Ingham | |
| 5,197,365 A | 3/1993 | Clifton | |
| 5,433,014 A * | 7/1995 | Falk | G01B 3/1061 33/755 |
| 7,020,978 B1 * | 4/2006 | Nelson | B25H 7/00 33/427 |
| 7,181,860 B1 * | 2/2007 | Umholtz | G01B 3/1056 33/758 |
| 7,640,676 B1 * | 1/2010 | Poole | B27B 27/04 33/628 |
| 8,020,312 B1 * | 9/2011 | McGahan | B26B 29/06 30/286 |
| 2002/0139002 A1 * | 10/2002 | Noon, III | G01B 3/1084 33/760 |

(Continued)

FOREIGN PATENT DOCUMENTS

WO    2009110879    9/2009

OTHER PUBLICATIONS

Extended European Search Report for EP15194982, dated Apr. 6, 2016, 8 pages.

*Primary Examiner* — G. Bradley Bennett
(74) *Attorney, Agent, or Firm* — McAndrews, Held & Malloy, Ltd.

(57) ABSTRACT

Apparatuses and methods based thereon are provided for onboard measurements in miter saws. A measurement device may be attached to or incorporated into a miter saw, where the measurement device being configured to provide onboard measurement when cuts are made using the miter saw. The measurement device may comprise a tape based measurement device. The measurement device may be portable to enable detaching it from the miter saw when on-location measurements are made, and attaching it to the miter saw when cut measurements are provided. The measurement device may comprise an output component (e.g., digital display) for outputting measurement readings and/or information associated with cut measurements. The measurement device (and/or the miter saw itself) may be configured for communicating signals wirelessly in accordance with one or more wireless technologies, such as to enable receiving measurements made remotely.

20 Claims, 8 Drawing Sheets

(56) References Cited

U.S. PATENT DOCUMENTS

| | | | | |
|---|---|---|---|---|
| 2003/0221329 A1* | 12/2003 | Gompper | | B23Q 9/0042 |
| | | | | 33/640 |
| 2006/0106482 A1 | 5/2006 | Etter et al. | | |
| 2006/0137202 A1* | 6/2006 | Clifton | | B27B 27/04 |
| | | | | 33/640 |
| 2006/0196072 A1* | 9/2006 | Lewis | | G01B 3/1071 |
| | | | | 33/760 |
| 2008/0052943 A1* | 3/2008 | Brooks | | G01B 3/1084 |
| | | | | 33/760 |
| 2014/0310968 A1* | 10/2014 | Sherman | | B25H 1/0078 |
| | | | | 33/759 |
| 2016/0016240 A1* | 1/2016 | Koegel | | B23D 59/001 |
| | | | | 83/76.8 |

* cited by examiner

ONBOARD MEASURING SYSTEM FOR MITER SAWS

TECHNICAL FIELD

Aspects of the present application relate to tools and related systems. More specifically, certain implementations of the present disclosure relate to onboard measuring system for miter saws.

BACKGROUND

Existing methods and apparatuses, if any exist, for incorporating measurements when operating saws (e.g., miter saws) may be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

Systems and/or methods are provided for an onboard measuring system for miter saws, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by some user-configurable setting, a factory trim, etc.).

Figure 1:
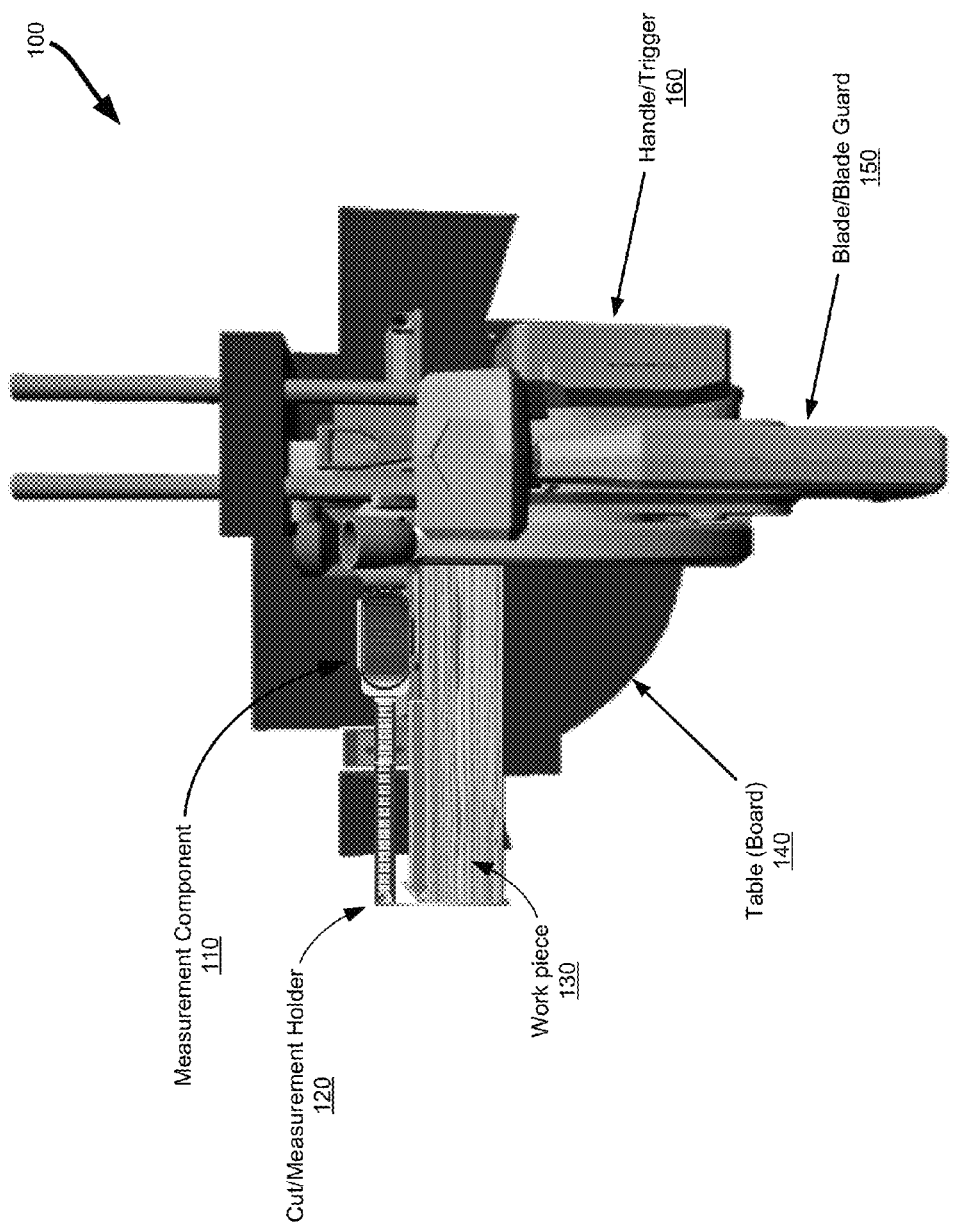
FIG. 1 illustrates an example miter saw incorporating an onboard measurement component, in accordance with an embodiment of the present invention.

FIG. 1 illustrates an example miter saw incorporating an onboard measurement component, in accordance with an embodiment of the present invention. Shown in FIG. 1 is a miter saw 100 which incorporates an onboard measurement component 110.

The miter saw 100 may be designed and/or implemented to make accurate crosscuts and miters in pieces (e.g., wood beams, etc.) that may be utilized in home improvement or other construction projects. As shown in FIG. 1 (from above perspective), the miter saw 100 may comprise a horizontal table (board) 140, and a blade/blade-guard assembly 150 (containing a circular sawing blade), which may be positioned above the table (board) 140. The blade/blade-guard assembly 150 may be configured to move vertically (by the user), such as by using a handle/trigger assembly 160, which may allow pushing the blade/blade-guard assembly 150 up and down, and may also be used (in its triggering function) to turn on/off the blade. In particular, the blade may be turned on (thus sawing) when the blade/blade-guard assembly 150 is moved down.

In various example implementations in accordance with the present disclosure, miter saws may be configured or modified to incorporate onboard measurement components, to provide measurements when making the cuts using the miter saws. For example, the miter saw 100 may incorporate the onboard measurement component 110. The measuring component 110 may be any suitable measuring device or tool, which may be incorporated (e.g., attached) to the miter saw 100. For example, the measurement component 110 may be something as simple as typical self-retracting tape measure. Nonetheless, the disclosure is not limited to use of tape-based devices, and in some example implementations, non-tape based measurement devices may be used for the onboard measurement component. For example, an encoder (rolling directly on the work piece 130) may be used.

Incorporating simple, basic measurement tools (e.g., tape measures) directly into miter saws as onboard measurement components may address possible limitations and/or challenges relating to cut measurements, and may allow doing so in optimal and economic way. In this regard, measurements from a location where pieces being cut would be applied may typically have to be transferred onto the work piece before the cuts are made using the miter saw. While stand-alone, elaborate and expensive industrial setups may exist and may be available for providing cut measurements, such solutions may not be economical (e.g., too costly) for consumer applications (e.g., home improvement, DIY applications), would require dedicated equipment, and/or may require too much space (e.g., occupying lots of floor space). Thus, incorporating simple, basic measurement tools (e.g., tape measures) directly into miter saws as onboard measurement components may address the need for making cut measurements in a cheap and convenient manner, by providing onboard cut measurements in miter saws with minimum cost, while allowing users to make cuts of required lengths without the need to first mark work pieces. In particular, a measuring tool (e.g., the measurement component 110) may be incorporated in a miter saw (the miter saw 100), or retro fitted to it, to enable users to cut material of specified lengths without having to first mark the work piece and then having to align the mark(s) made on the work piece to the cutting blade before making the cut.

In an example implementation, the onboard measurement component may be comprise a tape measure (or other similar tape mechanism) which may be incorporated into the miter saw—e.g., placed on the table/board of the miter saw, such as behind the fence (both sides for left and right cuts). Further, adjustments may be provided for initial zeroing and for change in length during miter, bevel and compound cuts.

In some example implementations, miter saws designed, configured, and/or modified for supporting and/or using onboard measurements may be operable to provide output and/or feedback to users, particularly output or feedback relating to onboard measurement related operations. For example, the miter saw (or the onboard measurement component itself) may incorporate suitable components for providing (e.g., displaying) precise measurement readings, to enable the user to clearly see or know the pertinent measurements. Further, in some example implementations, the miter saw (via the onboard measurement component itself or via other, dedicated component) may be operable to provide alerts (e.g., visual and/or audio alert) relating to the onboard measurements operations—e.g., alerting the operator when desired cutting length is achieved. Alternatively, rather than alerting the user, the miter saw may simply be configured to stop cutting the work piece 130 (e.g., using suitable mechanical stops) when the desired cutting length is achieved.

In an example implementation, the onboard measurement component may comprise suitable components for providing output (e.g., digital readout, for precise reading), such as a digital display and suitable associated circuitry. Such onboard measurement component may be incorporated into the miter saw in the same manner—e.g., placed on the table/board of the miter saw, such as behind the fence (both sides for left and right cuts). Further, adjustments may similarly be provided for initial zeroing and for change in length during miter, bevel and compound cuts. In another example implementation, an integrated display (or output) system may be used and incorporated into the miter saw to displaying additional information relating to the sawing operations—e.g., all relevant angles like miter and bevel angles along with length.

In an example implementation, the onboard measurement component may comprise suitable components for providing wireless connectivity (e.g., Near-field communication (NFC), Bluetooth, ZigBee, WiFi, etc.), such as built-in transceiver(s) and suitable associated circuitry. Such onboard measurement component may be incorporated into the miter saw in the same manner—e.g., placed on the table/board of the miter saw, such as behind the fence (both sides for left and right cuts). Further, adjustments may similarly be provided for initial zeroing and for change in length during miter, bevel and compound cuts. The measurements may be made remotely (at the job location) using a second (separate) measuring device also having built-in transceiver(s). Once the measurements are made, these measurements (e.g., in response to press of button) may be transmitted to the onboard measurement component in the miter saw. The measurements may be used immediately, or stored (e.g., in a memory of the onboard measurement component itself, or in a memory component of the miter saw). When the measurements are stored, they may be retrieved from the memory and applied (as needed) to the work piece to produce the required lengths/measurements.

In some example implementations, various aspects of the above described example implementations may be combined.

In an example use scenario, when utilizing existing miter saws (miter saws not incorporating onboard measurement components) to produce a work piece (e.g., work piece 130, which may be a wood beam or the like) of specified length, the user would need to make the measurements (e.g., at the job location, where the work piece would be applied), and then transfer these measurements onto the work piece—that is make markings on the work piece corresponding to the measurements, bring the work piece to the miter saw and place it there (against a cut holder 120), then move the work piece to align the mark with the cutting blade and then make the cut.

With the miter saw 100 (and similar miter saws incorporating onboard measurement components), all that would be needed is for the user to determine the final (desired) length, bring the work piece to the correct reading (using the onboard measurement component), and make the cut. An example use scenario is described in more detail with respect to FIG. 2, in which a wood piece 130 is cut using onboard measurements provided by the measurement component 110.

Figure 2:
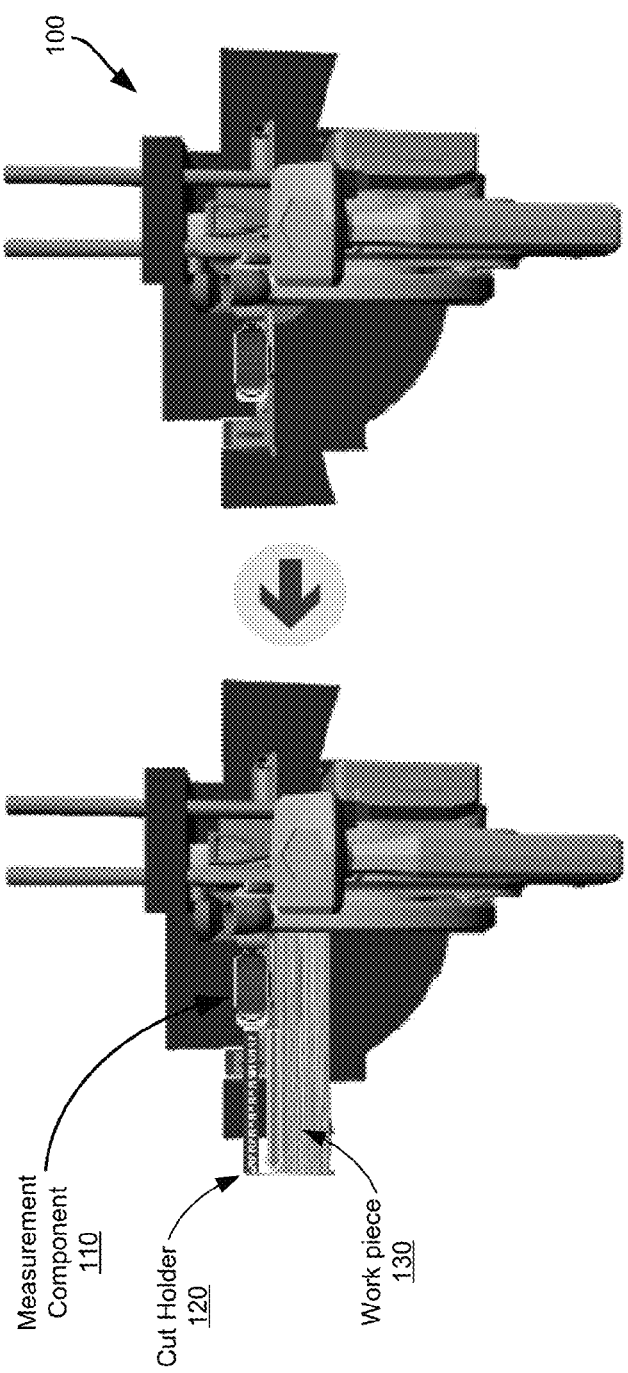
FIG. 2 illustrates an example use scenario of a miter saw incorporating an onboard measurement component, in accordance with an embodiment of the present invention.

FIG. 2 illustrates an example use scenario of a miter saw incorporating an onboard measurement component, in accordance with an embodiment of the present invention. Shown in FIG. 2 is the miter saw 100 of FIG. 1.

In an initial step, the miter saw 100 may be prepared for operation, which may comprise adjusting the system (as necessary) for the type of cut to be made—e.g., straight, miter, beveled or compound. After the necessary measurements for the work piece (e.g., the wood piece 130), without marking the piece, the onboard measurement component 110 may be used to make onboard cut measurement. For example, where the measurement component 110 may be a self-retracting tape measure, the tape may be extracted by engaging a floating tang or hook on the end of the tape ("tang") with the work piece 130 (or a cut holder 120 against which the end of work piece 130 is placed) to the reading corresponding to the desired cut measurement. The work piece 130 may then be secured (e.g., by clamping it) to the miter saw 100 (e.g., to the table/board 140), and the cut can then be made.

Figure 3:
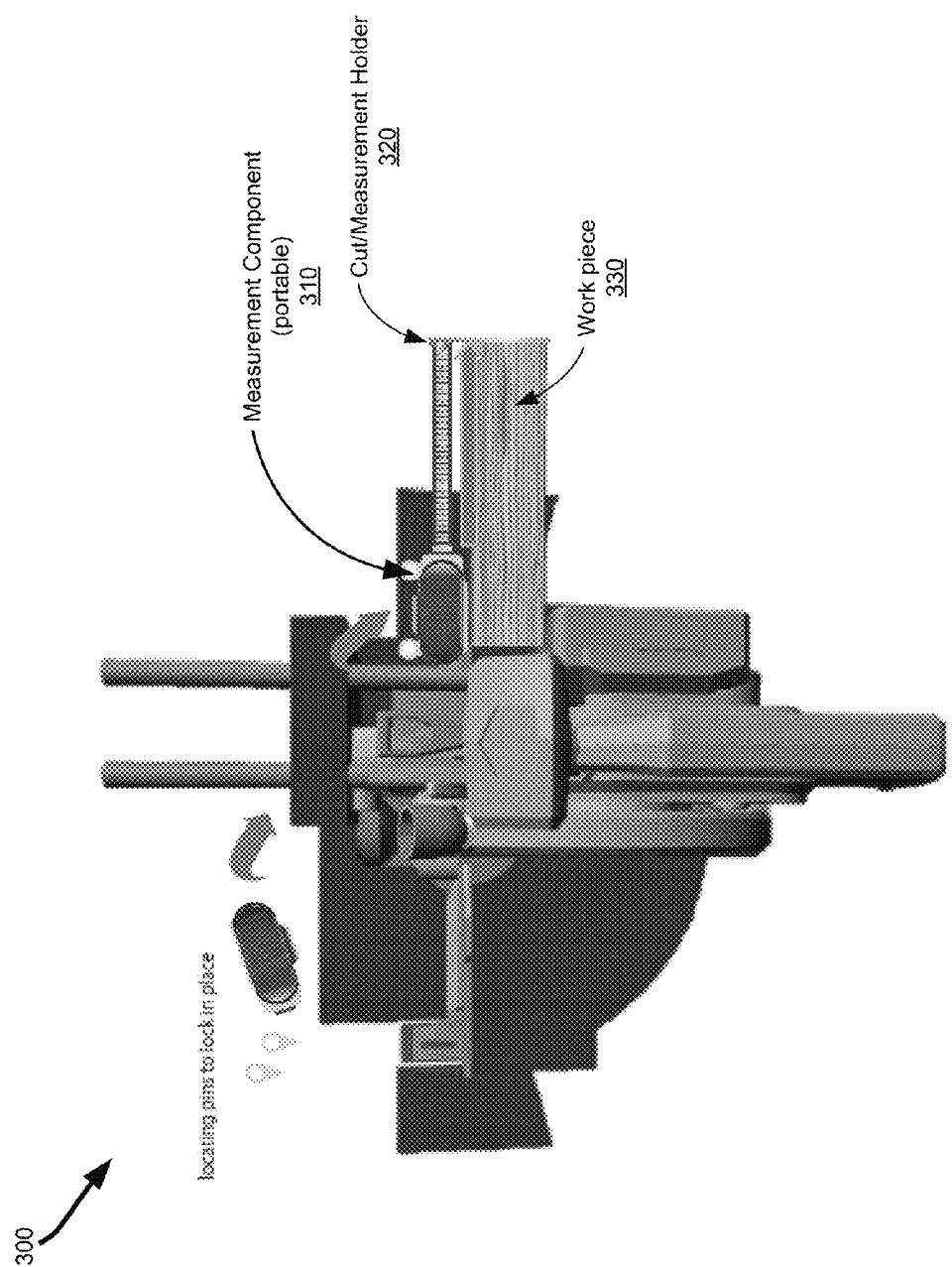
FIG. 3 illustrates an example miter saw incorporating a portable onboard measurement component, in accordance with an embodiment of the present invention.

FIG. 3 illustrates an example miter saw incorporating a portable onboard measurement component, in accordance with an embodiment of the present invention. Shown in FIG. 3 is a miter saw 300 which incorporates a portable (removable) onboard measurement component 310.

The miter saw 300 and the measurement component 310 thereof may be substantially similar to the miter saw 100 and the component measurement 110 thereof, respectively, and may be operated and/or used in substantially similar manner, as described with respect to FIG. 1. The measurement component 310 may be portable, however, and the miter saw 300 may be implemented to support use of portable or removable measurement components. In this regard, when necessary the measurement component 310 may be detached from the miter saw 300, so that it can be used in making any required measurements—e.g., determine the necessary cut measurements directly at a location where a work piece 330 (the piece to be cut) would be used. For example, where the work piece 330 is a wood beam that is being used to build a door frame, the measurement component 310 may be detached to enable making the necessary cut measurements while the wood beam is placed at or in the door opening (space).

Once the cut measurements are completed, the measurement component 310 may be inserted back into the miter saw 300. For example, locating pins may be used to attach measurement component 310 onto the miter saw's table or board. The measurement component 310 may then be used to apply the cut measurements, as determined on-location, as the work piece 330 is being cut. For example, the measurement component 310 may be used to pull the cut holder 320 away by a distance corresponding to the measured (desired) length of the wood beam 330 as determined during the on-location measurements.

Use of portable measurement components in this manner is desirable as it ensures that the same measurement system used in making the on-location measurements is also used to provide the onboard measurement at the miter saw. Further, use of portable (removable) measurement component may also allow for swapping different measurement components. This may allow for use of different types of measurements components and/or for supporting different types of measurements by the same miter saw.

Figure 4:
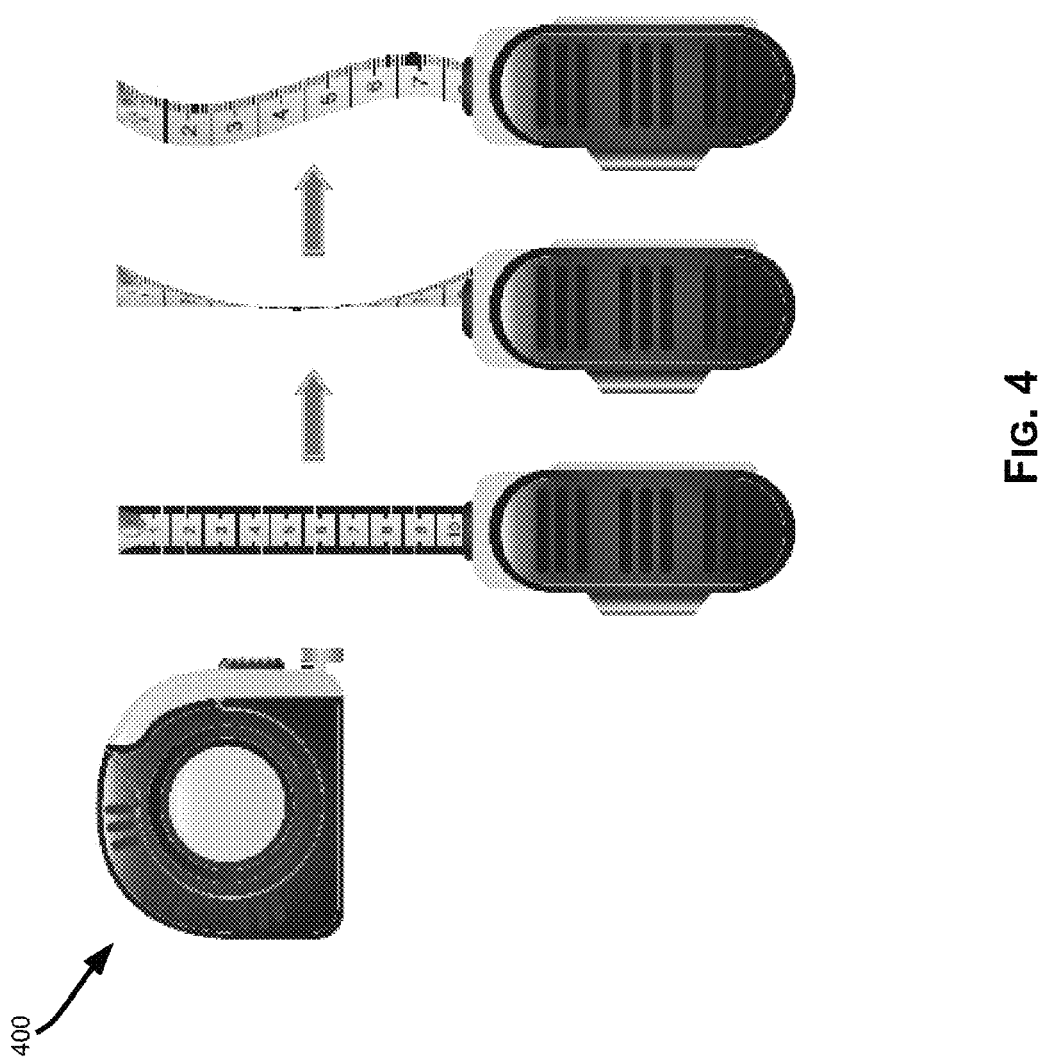
FIG. 4 illustrates an example measurement system for use in miter saws that incorporate onboard measurements, in accordance with an embodiment of the present invention.

FIG. 4 illustrates an example measurement system for use in miter saws that incorporate onboard measurements, in accordance with an embodiment of the present invention. Shown in FIG. 4 is a measurement system 400.

As shown in the example implementation depicted in FIG. 4, the measurement system 400 may comprise a dual-sided self-retracting tape measure (e.g., providing measurement in metric units, such as cm, and in inches). Because of the way the measurement system 400 may be attached to the miter saw (e.g., on the surface of the miter saw's board or table, near the point-of-cutting), any measurements made or provided based on the measurement system 400 may need to account for the measurement system 400 itself—that is the distance on the board/table taken up by the measurement system 400. For example, the dual-sided tape measure shown in FIG. 4 may have a pre-set or pre-determined length, which may be considered and/or accounted for when making or applying cutting measurements. The dual-sided tape shown in FIG. 4 may be determined to be 3-inches long, for example. Thus, when making or applying cutting measurements, any measurements shown by the dual-sided tape (the tape pulled out) must be adjusted by adding an offset of 3-inches (or its metric equivalent, when making the measurements in metric units).

Figure 5:
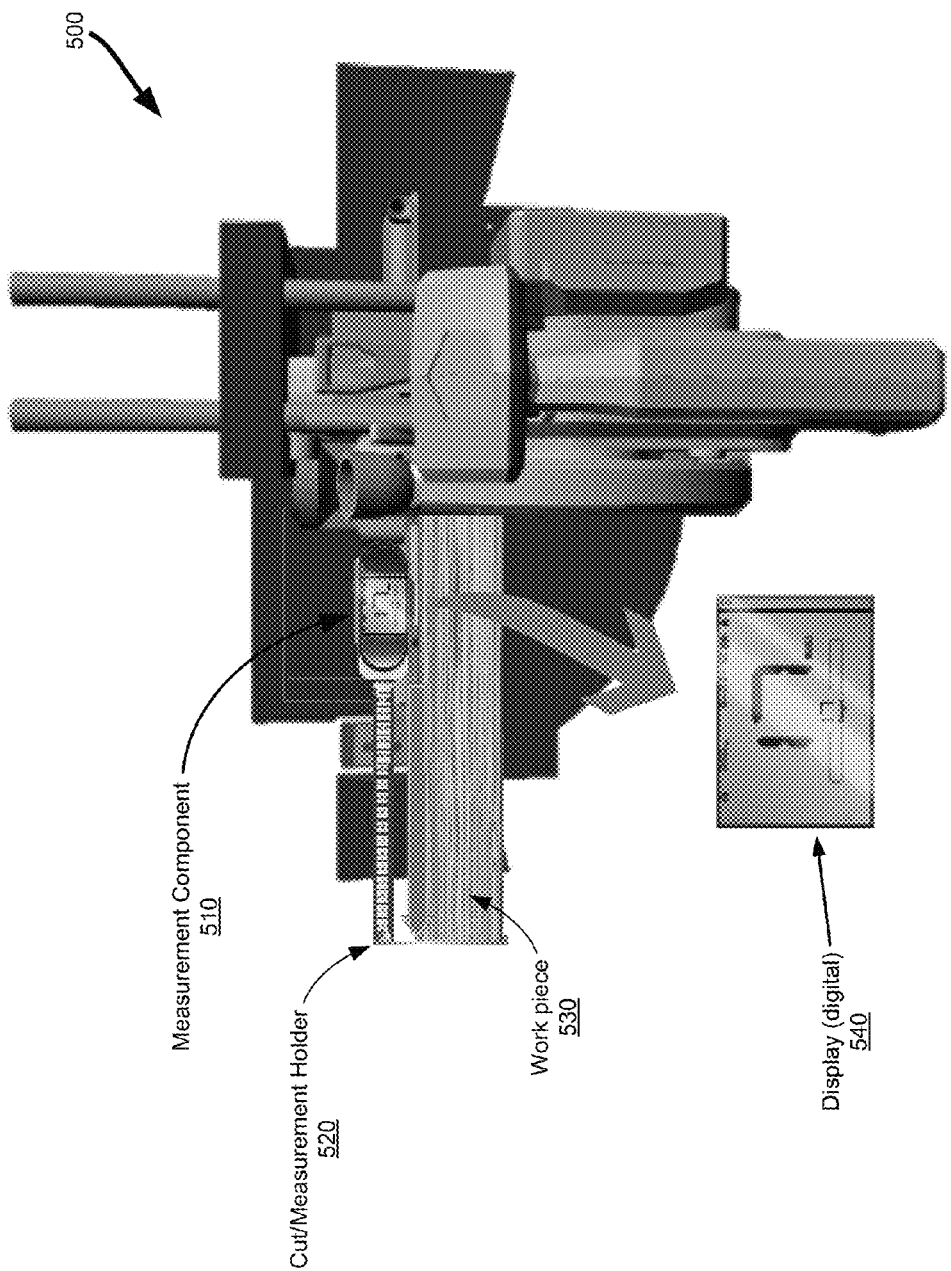
FIG. 5 illustrates an example miter saw incorporating an onboard measurement component with a digital interface (e.g., display), in accordance with an embodiment of the present invention.

FIG. 5 illustrates an example miter saw incorporating an onboard measurement component with a digital interface (e.g., display), in accordance with an embodiment of the present invention. Shown in FIG. 5 is a miter saw 500 which incorporates an onboard measurement component 510.

The miter saw 500 and the measurement component 510 thereof may be substantially similar to the miter saw 100 and the component measurement 110 thereof, respectively, and may be operated and/or used in a substantially similar manner, as described with respect to FIG. 1. However, the measurement component 510 may be additionally configured to providing output, such as digital measurement readings.

For example, the measurement component 510 may comprise a digital interface (e.g., a digital display) 540 and suitable associated circuitry (e.g., for processing, storage, etc.). The digital display 540 may be configured to display a reading corresponding to the measurement made by the measurement component—e.g., display the amount (distance) by which the tape (where the measurement component 510 comprises a tape measure or similar tape mechanism) is pulled out.

In some example implementations, the measurement component 510, and/or its digital display 540 may be configured to provide additional functions relating to readings provided via the digital display 540. For example, the digital display 540 may be operable to provide additional readings and/or to respond to a user's input for adjustments relating to the display operations performed by the measurement component 510. The readings provided by the digital display 540 may be, for example, switched (e.g., in response to user's selection) between metric and imperial units. Further, readings provided by the digital display 540 may be adjusted to account for certain offsets—e.g., the measurement components 510 itself. In this regard, the measurement components 510, and/or its digital display 540 may be configured to enable and/or support measurement adjustments (e.g., based on offset relating to the measurement component 510). An example of such offset-based adjustments is described in more detail with respect to FIG. 6.

In an example implementation, the measurement component 510 may be a portable (removable) component, and the miter saw 500 may be implemented such that to support use of portable or removable measurement components. Accordingly, the miter saw 500 and the measurement component 510 may be operated and/or used in substantially similar manner as described with respect to the miter saw 300 and its portable component 310, while also providing digital output (and adjustments thereof).

In an example implementation, the digital display 540 (and its associated circuitry) may be configured to support displaying additional information relating to the sawing operations—e.g., all relevant angles like miter and bevel angles along with length. In an alternative example implementation, a separate integrated display (or output) system may be used and incorporated into the miter saw for use in displaying such additional information relating to the sawing operations. Nonetheless, in yet another alternative example implementation, rather than incorporating a digital display into the onboard measurement component, such integrated display (or output) system may be used in displaying the measurement readings and, optionally, displaying any additional information relating to the sawing operations.

Figure 6:
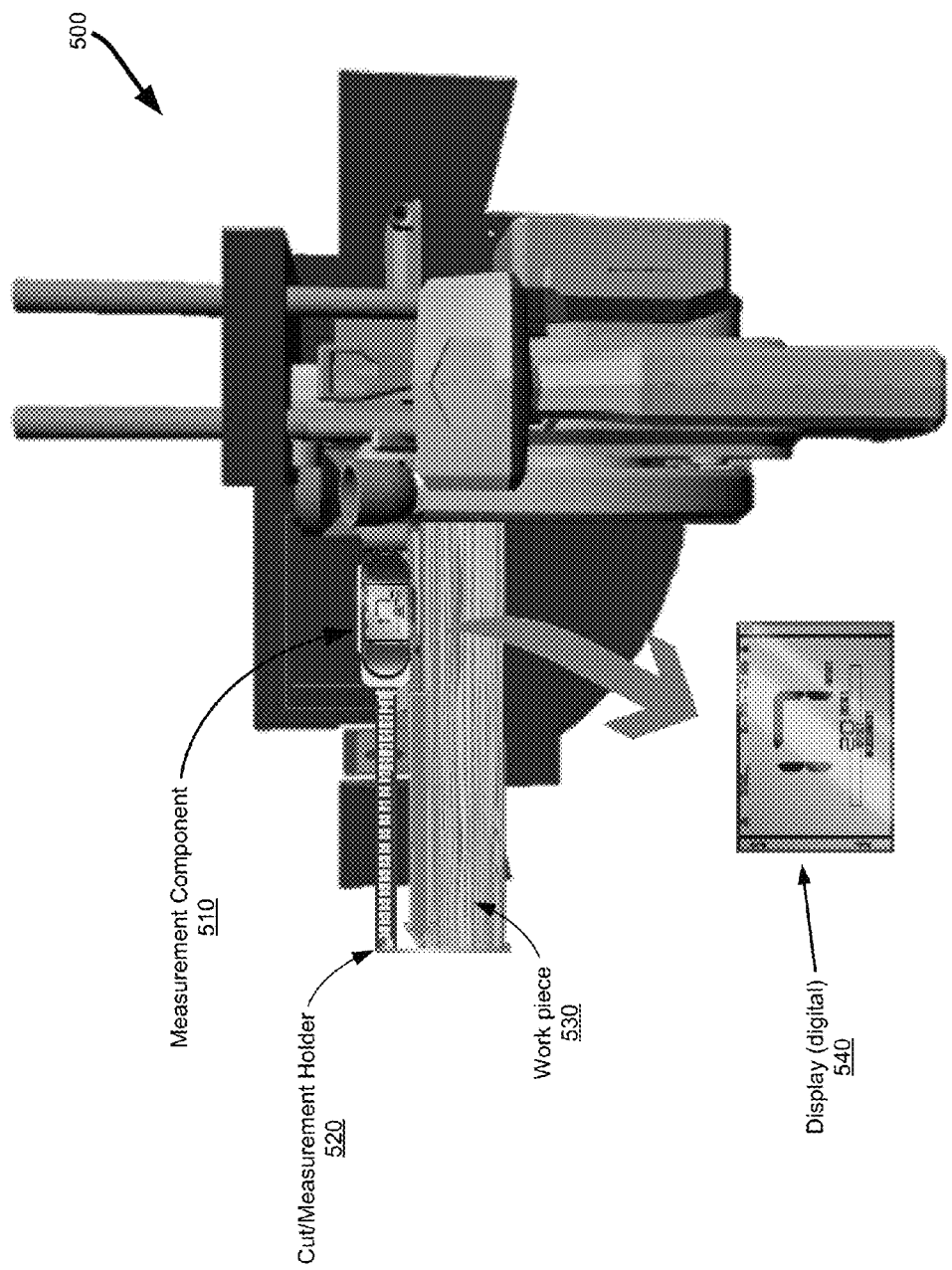
FIG. 6 illustrates an example use scenario of a miter saw incorporating an onboard measurement component with a digital interface (e.g., display), in accordance with an embodiment of the present invention.

FIG. 6 illustrates an example use scenario of a miter saw incorporating an onboard measurement component with a digital interface (e.g., display), in accordance with an embodiment of the present invention. Shown in FIG. 6 is the miter saw 500 of FIG. 5.

In the example use scenario depicted in FIG. 6, because the measurement system 510 may be attached so that it is closer to the point-of-cutting, any measurements made or provided based on the measurement system 510 may need to account for the measurement system 510 itself (e.g., the length of the component along the edge it is attached to the miter saw 500, which may be considered and/or accounted for when making or applying cutting measurements). The measurement system 510 may be 3-inches long, for example. Thus, when making or applying cutting measurements, any measurements must be adjusted by adding an offset of 3-inches (or its metric equivalent, when making the measurements in metric units). Accordingly, the display 540 may be configured to provide information relating to any such required offset.

For example, in addition to displaying a current measurement of 17-inches (e.g., corresponding to pulling a tape in the measurement component 510 out that distance), the display 540 may also display an offset of 3-inches (corresponding to the distance occupied by the measurement component 510 itself on the miter saw's board or table). Alternatively, the display 540 may be configured to directly display the combination of the measurement made by the measurement components and any applicable offset. Thus, while not shown in FIG. 6, the display 540 may simply display 20-inches (corresponding to the sum of the distance that the tape in the measurement component 510 is pulled out and the offset corresponding to length of the measurement component 510 itself).

Figure 7:
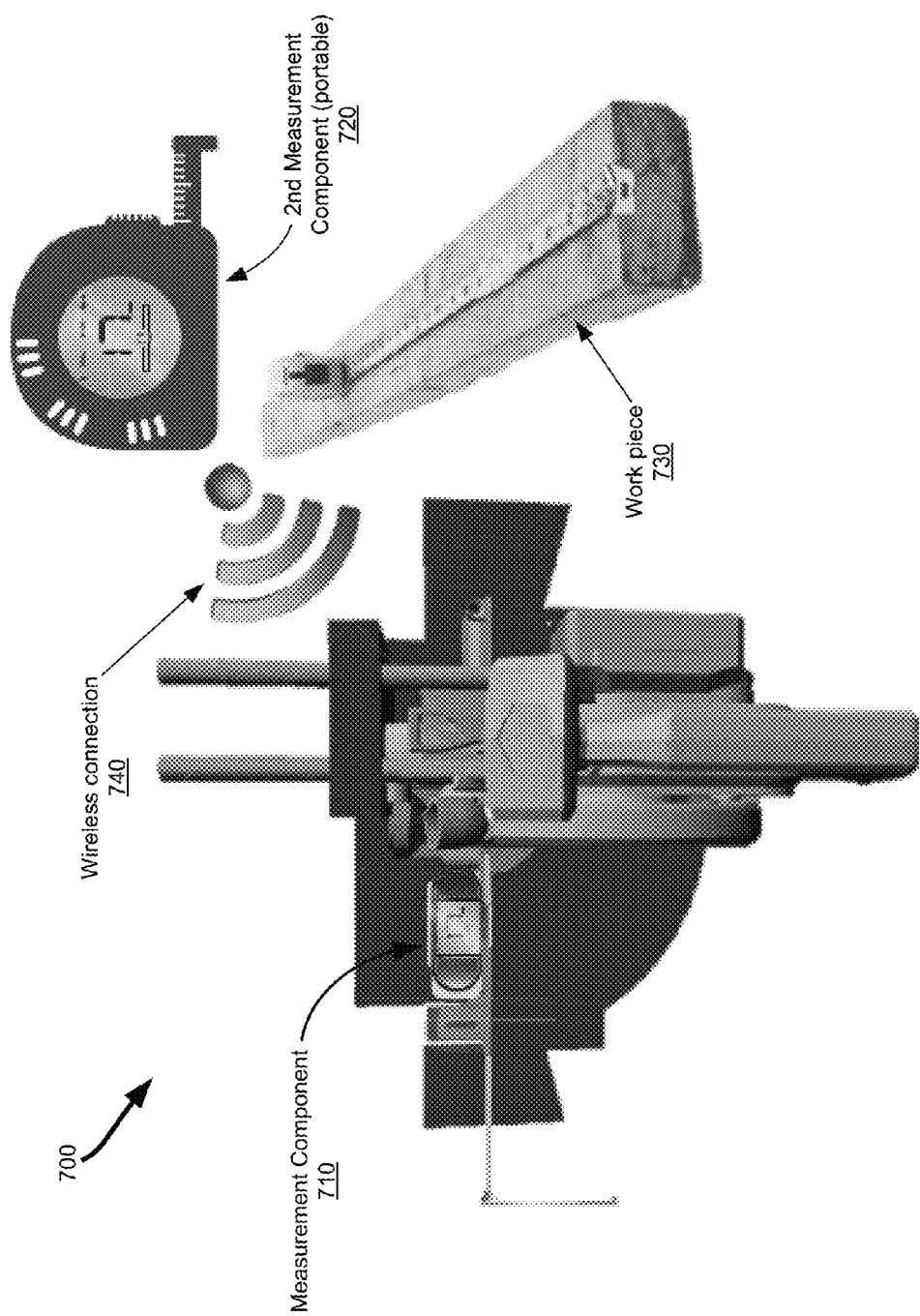
FIG. 7 illustrates an example miter saw incorporating an onboard measurement component, and which support wireless connectivity with remote measurement system, in accordance with an embodiment of the present invention.

FIG. 7 illustrates an example miter saw incorporating an onboard measurement component, and which supports wireless connectivity with a remote measurement system, in accordance with an embodiment of the present invention. Shown in FIG. 7 is a miter saw 700 which incorporates an onboard measurement component 710, and a second (portable) measurement system 720.

The miter saw 700 and the measurement component 710 may be substantially similar to the miter saw 100 and the component measurement 110, respectively, and may be operated and/or used in substantially similar manner, as described with respect to FIG. 1. However, the miter saw 700 and/or the measurement component 710 may be additionally configured to support and/or or enable wireless connectivity. Supporting wireless connectivity may enable receiving measurements made remotely (at the job location), such as by the second measurement system 720. Further, the miter saw 700 and/or the measurement component 710 may be configured to use received measurements in real-time, and/or to store the received measurements (e.g., in memory) such that these measurements may be retrieved and used when needed.

The second measurement system 720 may comprise any suitable measuring tool or device. Further, each of the measurement component 710 and the second measurement system 720 may comprise suitable components and/or circuitry (e.g., built-in transceiver(s), antennas, and suitable associated circuitry) for providing wireless connectivity in accordance with one or more suitable technologies—e.g., Near-field communication (NFC), Bluetooth, ZigBee, WiFi, etc.

Accordingly, the measurements may be made remotely (e.g., at the job location) and simply transmitted to the miter saw 700 for use therein. For example, the second measurement system 720 may be used to make the necessary measurements for a work pieced 730 remotely (where the work piece 730 is used). Once made, the measurements may be transmitted (automatically, or manually—e.g., in response to user input or selection, such as by pressing a button on second measurement system 720) from the second measurement system 720 to the miter saw 700 via a wireless connection 740 (e.g., Bluetooth connection). In this regard, the wireless connection 740 may be established when needed or prior to making the remote measurements.

Once received at the miter saw 700, the measurements may be used in real-time (immediately), or may be stored (e.g., in a memory of the onboard measurement component 710 itself, or in a memory component of the miter saw 700). When the measurements are stored, they may be retrieved from the memory and applied (as needed) to the work piece 730, to produce the required lengths/measurements.

Figure 8:
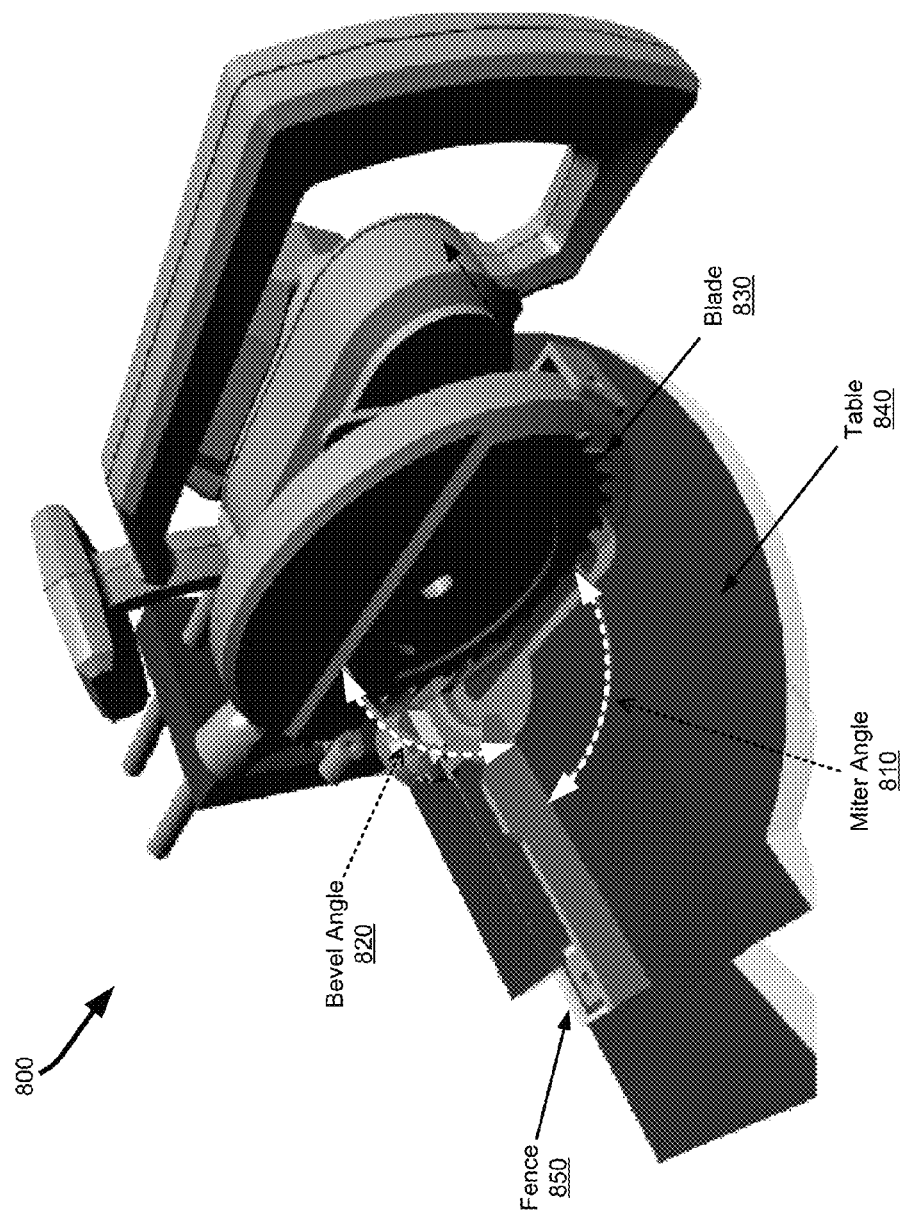
FIG. 8 illustrates an example miter saw incorporating an onboard measurement component and angle sensors, in accordance with an embodiment of the present invention.

FIG. 8 illustrates an example miter saw incorporating an onboard measurement component and angle sensors, in accordance with an embodiment of the present invention. Shown in FIG. 8 is a miter saw 700.

The miter saw 800 may be substantially similar to one or more of the previously described miter saws, and may be operated and/or used in substantially similar manner (e.g., the miter saw 100 as described with respect to FIG. 1). In this regard, the miter saw 800 may incorporate an onboard measurement component (not shown) for use in providing onboard measurements, substantially in similar manner as described hereinbefore. In addition, however, the miter saw 800 may also comprise angle sensors (and associated suitable circuitry) for obtaining angle measurements and/or for incorporating use of such angle measurements during operations of the miter saw. In this regard, an angle sensor may comprise any suitable sensor (e.g., suitable hardware, software, or combination thereof) for obtaining particular angle measurements with respect to one or more spatial alignments in the miter saw.

For example, the miter saw 800 may comprise two angle measuring sensors (not shown), one for the miter angle 810 and the second for the bevel angle 820 (as shown in FIG. 8). The miter angle 810 is the angle between a plane passing through the miter saw's fence 850 (vertical plane) and the miter saw's blade 830, whereas the bevel angle 820 is the angle between a plane of the miter saw's table 840 (horizontal plane) and the blade 830. During operations of the miter saw 800, angle readings from these sensors (e.g., corresponding to the miter angle 810 and the bevel angle 820) may be obtained (and if necessary, provided to other components in the miter saw 800, such as the onboard measurement component thereof, and/or any circuitry used in conjunction therewith), which may then use these angle readings (e.g., if/when needed) during onboard measurement operations. For example, such angle readings may be used to calculate the resultant offset due to these two angles (miter and bevel). Further, in some implementation, such angle readings may be provided to the user. For example, where digital display is used in the miter saw (for use during onboard measurements), the miter angle 810 and the bevel angle 820 (and the resultant offset reading) may be displayed on the readout digital display.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed:

1. An apparatus, comprising:
   a miter saw;
   a measurement device that is attached to or incorporated into the miter saw, the measurement device being configured to provide onboard measurement when cuts are made using the miter saw; and
   a feedback component operable to provide alerts relating to onboard measurements obtained using the measurement device.

2. The apparatus of claim 1, wherein the measurement device comprises a tape based measurement device.

3. The apparatus of claim 1, wherein the measurement device is portable to enable detaching it from the miter saw when on-location measurements are made, and enable attaching it to the miter saw when cut measurements are provided.

4. The apparatus of claim 1, wherein the measurement device is operable to provide measurements in a plurality of measurement standard systems.

5. The apparatus of claim 1, comprising an output component for outputting measurement readings and/or information associated with cut measurements.

6. The apparatus of claim 5, wherein the output component comprises a digital display and one or more associated circuits.

7. The apparatus of claim 5, wherein the output component is built into the measurement device.

8. The apparatus of claim 1, comprising a communication component for communicating signals wirelessly in accordance with one or more wireless technologies.

9. The apparatus of claim 8, wherein the communication component comprises one or more transceivers.

10. The apparatus of claim 8, wherein the communication component is built into the measurement device.

11. The apparatus of claim 1, comprising a storage component for storing data associated with cut operations, measurements, and/or use of the measurement device.

12. The apparatus of claim 11, wherein the storage component is built into the measurement device.

13. A measurement device, comprising:
    a measurement element operable to provide spatial measurements in accordance with one or more measurement standard systems; and
    a feedback element operable to provide alerts relating to onboard measurements obtained using the measurement element;
    wherein the measurement device is configurable for attachment to or incorporation into a miter saw, the measurement device being configured to provide onboard measurement when cuts are made using the miter saw.

14. The measurement device of claim 13, wherein the measurement device comprises a tape based measurement device.

15. The measurement device of claim 13, wherein the measurement device is portable to enable detaching it from the miter saw when on-location measurements are made, and attaching it to the miter saw when cut measurements are provided.

16. The measurement device of claim 13, comprising an output component for outputting measurement readings and/or information associated with cut measurements.

17. The measurement device of claim 16, wherein the output component comprises a digital display and one or more associated circuits.

18. The measurement device of claim 13, comprising a communication component for communicating signals wirelessly in accordance with one or more wireless technologies.

19. The measurement device of claim 18, wherein the communication component comprises one or more transceivers.

20. The measurement device of claim 13, comprising a storage component for storing data associated with operations and/or use of the measurement device.

* * * * *